March 16, 1971  F. V. GUERRERO  3,570,065
PIPE BELLING
Filed March 21, 1968  2 Sheets-Sheet 1

INVENTOR.
FERNANDO V. GUERRERO
BY
William A. Mckesoff Jr.
ATTORNEY

United States Patent Office 3,570,065
Patented Mar. 16, 1971

3,570,065
PIPE BELLING
Fernando V. Guerrero, Chagrin Falls, Ohio, assignor to Continental Oil Company, Ponca City, Okla.
Filed Mar. 21, 1968, Ser. No. 715,067
Int. Cl. B29c 17/02
U.S. Cl. 18—19                                                                     4 Claims

ABSTRACT OF THE DISCLOSURE

A ram assembly for forming a square-shouldered bell on a plastic pipe end, comprising a segmented ram containing a deformable annular ring.

---

This invention relates to deforming or upsetting the end of a hollow cylindrical thermoplastic object, such as a pipe.

Bell and spigot joints, such as for pipe, have been known for many years. In some such joints, the bell or socket is fabricated as a separate piece, and then attached to the pipe end. However, it is simpler to flare or otherwise stretch the actual pipe end so as to form the bell, since no extra pieces are required. Although this technique has been used, a major fabrication problem has been in forming the bell so that its internal shoulder, against which the next adjacent pipe joint butts, is sufficiently square that very little internal gap is left in the assembled joint to offer flow resistance and to act as a rough spot which collects debris.

According to this invention there is provided an internal forming ram which is capable of producing a bell having improved flow characteristics.

The invention can be better understood by reference to the drawing, in which.

Figure 1:
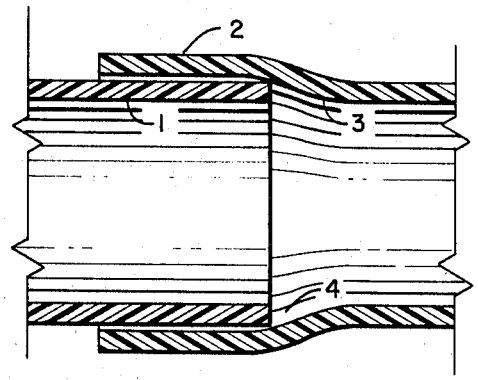
FIG. 1 is a cross-section of the typical bell and spigot joint of the prior art.

Referring now to FIG. 1, there is illustrated an end or spigot 1 of a first pipe, which fits into the bell 2 of a second pipe, in the manner of many prior art joints. Such joints are sometimes provided with one or more gaskets, but their presence or absence is immaterial to the concept of this invention. It can be seen that the slanted interior wall 3, which is a result of the methods used for forming such bells, leaves an annular gap 4 adjacent the end of pipe 1, which provides a flow resistance, and allows debris to collect.

Figure 2:
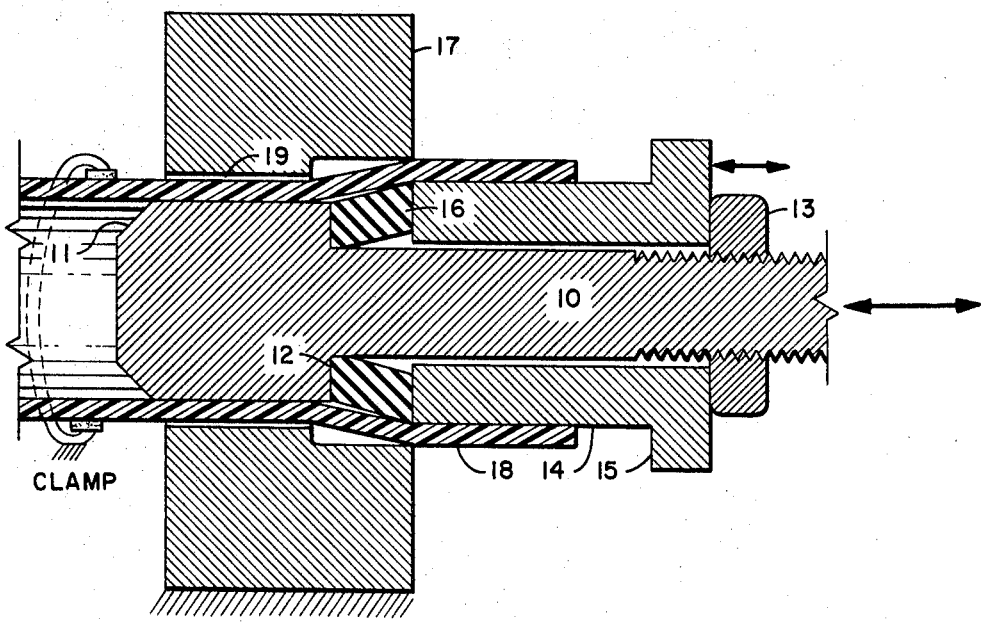
FIGS. 2 and 3 are cross-sections of one embodiment of my invention in different stages of its operation.

The invention, as shown in FIG. 2, consists primarily of a deformable male ram. This ram in turn consists of a central guiding and restraining rod 10 having a chamfered or otherwise streamlined end 11, a shoulder 12, and an adjusting nut 13, a forming sleeve 14 preferably having a shouldered end 15 and disposed slideably on rod 10, and a transition piece 16 of generally frusto-conical configuration, made of nature or artificial rubber, neoprene, or other deformable material. The use of female forming die 17 is optional, and will be discussed later.

Operation of the device is as follows. If female die 17 is used, the end of the plastic pipe 18 to be belled is placed through the opening 19 of die 17. Of course, prior to belling, the plastic pipe 18 is of substantially the uniform diameter shown at its left end. The end of the pipe is then heated, as by radiant heaters, contact with a heating fluid, or in other suitable manner, until it is sufficiently softened for forming, as is well known in the art. Rod 10 is then pushed to the left, with its chamfered end 11 entering the end of the pipe and centering the entire ram device with respect to the pipe. Moving rod 10 to the left also causes sleeve 14 and transition piece 16 to move to the left, because of stop nut 13. The streamline configuration of chamfer 11 and transition piece 16 allow the ram assembly to be inserted into the pipe end with relative ease, and cause the pipe end to be belled, as shown in FIG. 2 wherein the entire ram assembly has been inserted about half-way to shoulder 15.

Figure 3:
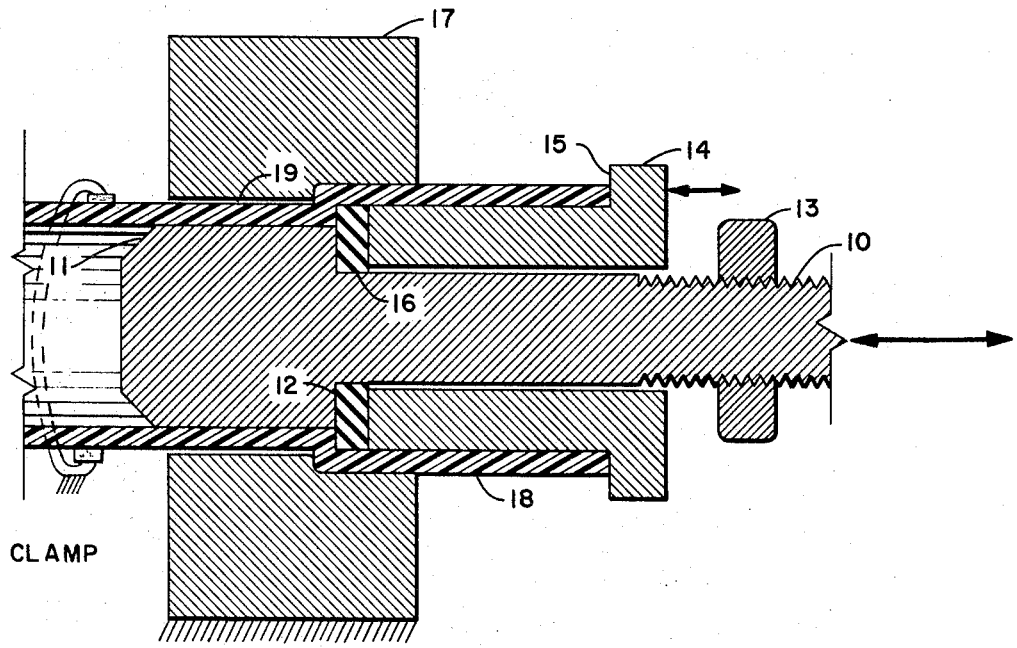

Movement of the ram assembly to the left, via the force applied to rod 10, is continued until it has reached the position shown in FIG. 3, at which time rod 10 is locked or otherwise held in position, and a force is applied by any suitable means to cause sleeve 14 to move to the left with respect to rod 10. This relative motion between sleeve 14 and rod 10 distorts and compresses transition piece 16 to the shape shown, i.e. rectangular, and forms virtually a square internal shoulder inside the bell. After the plastic has cooled, the entire ram assembly is retracted to the right. If the female die 17 has been used, the pipe joint is now removed from it by pulling the pipe out to the right.

Figure 4:
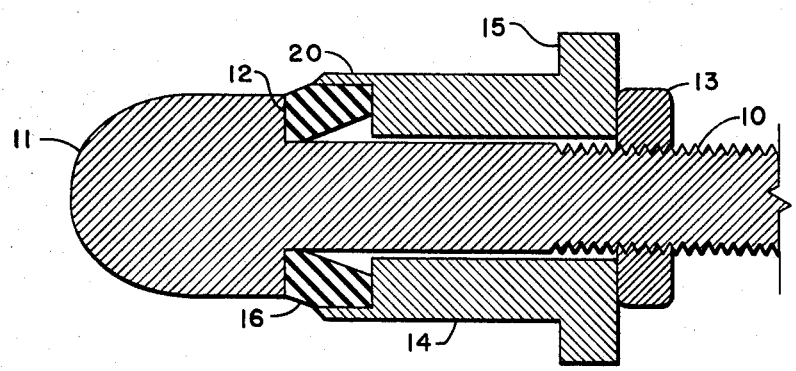
FIG. 4 is a cross-section of another embodiment of my invention.

As stated previously, female die 17 need not be used. The embodiment of the ram assembly shown in FIG. 4 is especially useful in such an instance. In FIG. 4, parts corresponding to those of the embodiment of FIGS. 2 and 3 have like numerals. This embodiment differs from the previous one in provision of annular lip 20 extending forward from sleeve 14 so as to surround the periphery of transition piece 16. Thus, when the sleeve 14 is moved forward (left) relative to rod 10, the annular lip prevents outward bulging of transition piece 16 as it is deformed into its stressed condition of approximately a right hollow cylindrical configuration which, in the previous embodiment, is restrained by the shape of die 17.

During operation, pipe 18 is restrained from movement by any suitable clamping device, as known in the art, such as by grippers applied to the external surface of the pipe at the left of die 17. The forces which advance and retract rod 10 and sleeve 14 can be applied in any suitable manner, such as mechanically, electrically, or hydraulically. The bell and spigot joint of subject invention can be gasketed or not, as desired, by suitably sizing the outside diameter of sleeve 14. Further, sleeve 14 need not be provided with shoulder 15; the latter serves as an aid in forcing the softened pipe into the contours of the female die, when such is used. The invention is suitable for belling the end of pipe made from any type thermoplastic which can be manipulated in a heat-softened state. The materials from which the various ram assembly parts and die are made can be varied so as to obtain the desired coefficient of friction, and lubricant can also be used if desired. Female die 17, when used, can be split in a plane axial with the opening therethrough, so that the die halves can be advanced to or retracted from the pipe in order to avoid the necessity of pulling the entire pipe length through the die opening after the belling operation has been completed.

While the invention has been described in terms of certain embodiments thereof, it is to be understood that it is not limited thereto and includes a variety of operating conditions and means useful for carrying out the invention.

What I claim is:

1. A ram device for producing an increased diameter of an end portion of a hollow tubular thermoplastic object, which device comprises:

(a) rod means having, at a first end thereof, an enlargement of an outside diameter of about that of said hollow of said object, (b) means for moving said rod means in an axial direction, (c) means for restraining said object with respect to axial motion of said rod means, (d) sleeve means slideably disposed on said rod means and having an outside diameter of about that of the inside diameter of said increased diameter, (e) means for moving said sleeve means axially with respect to said rod means, (f) transition piece means of a deformable material and having a generally frusto-conical configuration, when in a relaxed condition, disposed axially on said rod means between said enlargement and said sleeve means, the minor outside diameter of said configuration corresponding approximately to that of said enlargement and the major outside diameter of said configuration corresponding approximately to that of said sleeve means; and (g) female die means of an internal configuration corresponding to the external lateral configuration of said end portion of increased diameter, said female die means being restrained in a position surrounding said first end of said rod means when said first end is advanced by said means of paragraph (b).

2. The device of claim 1 wherein the end of said enlargement has a streamlined configuration.

3. The device of claim 1 further provided with means for adjusting the limit of motion of said sleeve means relative to said rod means.

4. A ram device for producing an increased diameter of an end portion of a hollow tubular thermoplastic object, which device comprises:

(a) rod means having, at a first end thereof, an enlargement of an outside diameter of about that of said hollow of said object, (b) means for moving said rod means in an axial direction, (c) means for restraining said object with respect to axial motion of said rod means, (d) sleeve means slideably disposed on said rod means and having an outside diameter of about that of the inside diameter of said increased diameter, said sleeve means being provided, at the end thereof closest said enlargement, with an annular peripheral protrusion of a length about equal to the axial length of the transition piece means of paragraph (f) when said transition piece means is in a stressed condition of approximately a right hollow cylindrical configuration, (e) means for moving said sleeve means axially with respect to said rod means, and (f) transition pieces means of a deformable material and having a generally frusto-conical configuration, when in a relaxed condition, disposed axially on said rod means between said enlargement and said sleeve means, the minor outside diameter of said configuration corresponding approximately to that of said enlargement and the major outside diameter of said configuration corresponding approximately to the internal diameter of said protrusion.

References Cited
UNITED STATES PATENTS

| | | |
|---|---|---|
| 2,458,854 | 1/1949 | Hull et al. |
| 2,779,996 | 2/1957 | Tanis _____ 18—19TEX |
| 3,341,894 | 9/1967 | Flaming. |
| 2,977,633 | 4/1961 | Breitenstein _____ 18—19X |

CHARLES W. LANHAM, Primary Examiner

R. S. ANNEAR, Assistant Examiner